United States Patent [19]

Condit et al.

[11] Patent Number: 4,830,531

[45] Date of Patent: May 16, 1989

[54] UNITARY CONNECTION ASSEMBLY FOR METAL CHANNELS AND METHOD FOR ASSEMBLY

[75] Inventors: Timothy B. Condit; John F. German, both of Plymouth; Ellwood Irish, Wayne, all of Mich.

[73] Assignee: Unistrut International Corp., Wayne, Mich.

[21] Appl. No.: 36,146

[22] Filed: Apr. 2, 1987

Related U.S. Application Data

[63] Continuation-in-part of Ser. No. 784,090, Oct. 4, 1985, abandoned.

[51] Int. Cl.[4] .............................................. F16B 39/00

[52] U.S. Cl. ................................ 403/348; 403/405.1; 411/85; 411/104; 411/552

[58] Field of Search ............... 403/405.1, 406.1, 408.1, 403/348, 353; 411/84, 85, 101, 104, 111, 112, 401, 349, 552

[56] References Cited

U.S. PATENT DOCUMENTS

| | | | |
|---|---|---|---|
| 2,345,650 | 4/1944 | Attwood . | |
| 2,831,520 | 4/1958 | Clarke | 411/349 |
| 2,944,642 | 7/1960 | Evans . | |
| 3,075,622 | 1/1963 | Attwood . | |
| 3,171,182 | 3/1965 | Danehy | 411/349 X |
| 3,221,847 | 12/1965 | Attwood . | |
| 3,332,182 | 7/1967 | Mark | 403/353 X |
| 3,362,738 | 1/1968 | Dygert et al. . | |
| 3,397,934 | 8/1968 | Dushek . | |
| 3,429,601 | 2/1969 | Bremers . | |
| 3,483,910 | 12/1969 | La Londe et al. . | |
| 3,504,875 | 4/1970 | Johnson et al. . | |
| 3,874,041 | 4/1975 | Smith . | |
| 3,908,330 | 9/1975 | Frach et al. | 403/348 |
| 3,975,804 | 8/1976 | Schrenk . | |
| 4,035,097 | 7/1977 | Bachand | 403/348 |
| 4,128,923 | 12/1978 | Bisbing . | |
| 4,270,718 | 6/1981 | Conner, Jr. . | |
| 4,308,646 | 1/1982 | Schenk . | |
| 4,309,123 | 1/1982 | Moore . | |
| 4,442,571 | 4/1984 | Davis et al. | 411/552 |
| 4,460,299 | 7/1984 | Kowalski | 411/85 |
| 4,486,133 | 12/1984 | Pletcher | 411/84 |
| 4,545,697 | 10/1985 | Verdenne et al. | 403/405.1 |

OTHER PUBLICATIONS

Southco Fasteners, Fastener Handbook, 1984, all pages.
Levine, Quick-Release Fasteners, 8/1956, pp. 195 & 198.
B-Line Systems Inc., "Twirl-Nut", pp. 30A, 30B, 31.

*Primary Examiner*—Randolph A. Reese
*Assistant Examiner*—Peter M. Cuomo
*Attorney, Agent, or Firm*—Gifford, Groh, Sheridan, Sprinkle and Dolgorukov

[57] ABSTRACT

A unitary connection assembly for connecting channel structures is described. The assembly has a special channel fastener coacting with a fixture, a biasing member and a threaded member. A method is described for attaching the unitary connection assembly to a channel.

10 Claims, 3 Drawing Sheets

80
40
300
90

96
102
113
100
99
100
103
90
98
112
91
101

80
40
401
402
90
400

80
83
70
50
30
90

UNITARY CONNECTION ASSEMBLY FOR METAL CHANNELS AND METHOD FOR ASSEMBLY

This is a continuation-in-part of co-pending application Ser. No. 784,090 filed on Oct. 4, 1985, now abandoned.

FIELD OF THE INVENTION

This invention relates to a framing connection. More particularly, it relates to a unitary framing connection for metal channel and a method for assembly.

BACKGROUND OF THE INVENTION

In making a metal framing connection between metal channels as described and illustrated in U.S. Pat. Nos. 2,345,650 and 2,696,139 to Attwood, one inserts a channel type nut having a spring attached into the continuous slot of one of the channels. The channel nut is turned 90° clockwise to position the parallel grooves in the nut with the inturned flange edges of the channel. The spring on the back of the nut holds the nut against the flange edges until the connection is complete. A fitting is positioned over the nut and a bolt is inserted through the fitting and threaded into the nut and tightened to the required torque to complete the connection of the fitting to the channel. The same procedure is used to connect the other channel to complete the connection between the two channels.

The disadvantages of the above procedure using the fasteners described are as follows:

1. The simplest of connections between two channels consists of 5 separate parts, a fitting, 2 nuts and 2 bolts. More complex connections require even more parts.

2. Nuts using a support spring to push against the inside back of the channel to hold it in place until a bolt is threaded into place require different length springs to accommodate different depths of channels. In addition, the channels cannot accommodate a run of wire or pipe within the channel when nuts having support springs attached are used.

3. Small parts, i.e., nuts and bolts, may easily be dropped or misplaced during assembly.

4. When the bolt is inserted through the fitting, the nut can be tipped and dislodged. In a vertical channel arrangement it could fall out of the channel.

SUMMARY OF THE INVENTION

In accordance with one aspect of the present invention, a new and improved structural assembly comprises in combination a channel member, and a unitary connection assembly.

The channel member has a depth, a width, a bottom section, two parallel side sections being spaced apart by a distance between the side sections, and a top section parallel with the bottom section. The side sections being substantially perpendicular with the bottom section and the top section. The top section has a longitudinal slot bordered by inwardly projecting flanges. The flanges each have an end portion and the flanges are spaced apart by a slot width.

The unitary connection assembly comprises in combination a fastener, a fixture having an aperture, a biasing member, and a threaded member.

The fastener has a body member and a centrally located threaded stud portion. The body member has a depth, a width, a length longer than its width, opposite parallel longitudinal side surfaces, end surfaces, a top major face, and an opposite bottom major face substantially perpendicular to the side surfaces. The width of the body member being less than the slot width of the channel member. The body member has flange engaging members located on the top major face perpendicular to the parallel longitudinal side surfaces for engaging the end portions of the flanges of the channel member. The flange engaging members are spaced apart and centered on the top major face of the body member. The longitudinal side surfaces are contiguous with the end surfaces forming a first and a second set of diagonally opposite corners. The first set of diagonally opposite corners are foreshortened and are spaced apart by a first set diagonal dimension. The first set diagonal dimension is sufficiently less than the distance between the parallel side sections of the channel member to provide clearance between the first set of diagonally opposite corners and the parallel side sections during installation of the unitary connection assembly. The body member has a centrally located threaded stud portion extending above the top major face of the body member. The threaded stud portion has an end portion having a positioning portion for aligning the flange engaging members of the body member with the end portion of the flanges of the channel member.

The biasing member coacts with the fixtures having an aperture and the threaded member of the fastening assembly. The threaded member of the unitary connection assembly coacts with the biasing member, the fixture, and the threaded stud of the fastener. The threaded member is adapted to cover the biasing means and to engage the fixture of the unitary connection assembly. The channel member is affixed to the unitary connection assembly by the fastener coacting with the channel member, the fixture, the biasing means, and the threaded member.

In accordance with another aspect of the present invention, a new and improved unitary connection assembly for connecting channel members comprises in combination a fastener, a fixture having at least one aperture, a biasing member, and a threaded member.

The fastener has a body member and a centrally located threaded stud portion. The body member has a first body diagonal, a second body diagonal, a depth, a width, a length longer than its width, opposite parallel longitudinal side surfaces, end surfaces, a top major face, and an opposite bottom major face substantially perpendicular to the side surfaces. The width of the body member is less than the slot width of the channel member. The body member has flange engaging members located on the top major face perpendicular to the parallel longitudinal side surfaces for engaging the channel members. The flange engaging members of the body member are spaced apart and centered on the top major face of the body member. The centrally located threaded stud portion extends above the top major face of the body member. The threaded stud portion has an end portion. The end portion of the threaded stud has a positioning portion for aligning the flange engaging members of the body member with the channel members.

The biasing member of the unitary connection assembly coacts with the mixture and the threaded member of the unitary connection assembly. The threaded member of the unitary connection assembly coacts with the biasing member, the fixture, and the threaded stud of the fastener.

In accordance with another aspect of the present invention, a new and improved method of attaching a unitary connection assembly to a channel member comprises the following steps:

Step 1—The fastener of the unitary connection assembly is rotated to enable the body member to pass between the flanges of the channel member when the unitary connection assembly is placed on the top section of the channel member.

Step 2—The unitary connection assembly is placed upon the top section of the channel member.

Step 3—A compressive force is applied to the threaded stud of the fastener to position the body member into the channel member to provide clearance between the top major surface of the body member and the end portions of the flanges of the channel member when the body member is rotated.

Step 4—The body member is rotated clockwise while the compressive force of step 3 is maintained to align the flange engaging members of the body member with the end portions of the flanges of the channel member.

Step 5—The compressive force which was applied in step 3 and maintained in step 4 is removed to engage the flange engaging members of the body member with the end portions of the flanges of the channel member.

Step 6—The threaded member is rotated clockwise to apply a torque sufficient to engage the threaded member with the fixture and sufficient to compress the biasing member to provide a requisite torque to affix the unitary connection assembly to the channel member.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

Figure 1:
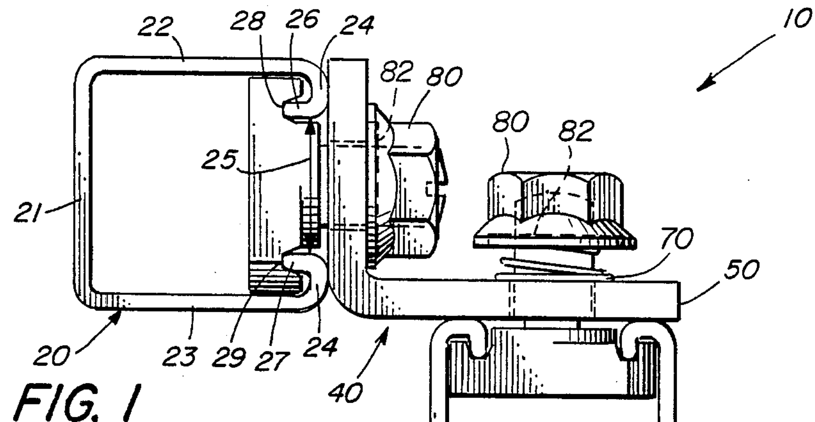
FIG. 1 is an end view of a unitary connection assembly of the present invention attached to a channel member.
Figure 2:
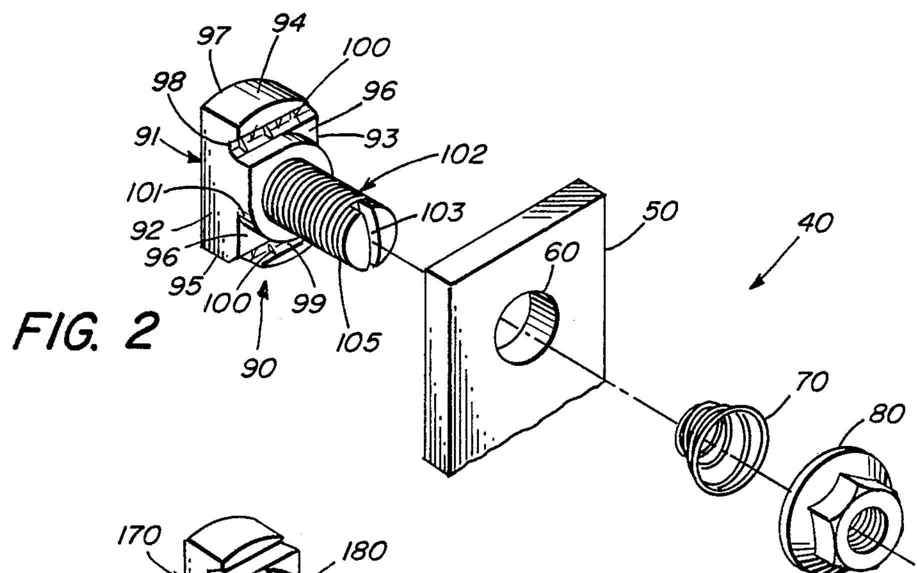
FIG. 2 is a perspective view, in part, of a unitary connection assembly of the present invention.

Referring to the drawings, there is shown in FIG. 1 a structural assembly 10, channel members 20 and 30, and unitary connection assembly 40.

Figure 4:
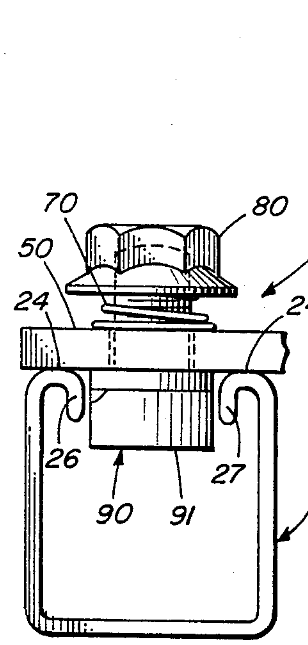
FIG. 4 is an end view, in part, of the unitary connection assembly illustrated in FIG. 1 being positioned on a channel member.
Figure 5:
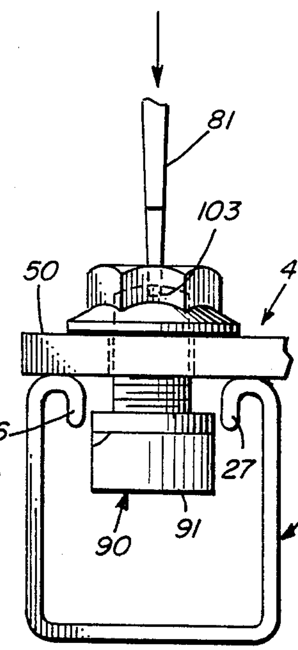
FIG. 5 is a view similar to FIG. 4 illustrating the position of the unitary connection assembly with the spring compressed.
Figure 6:
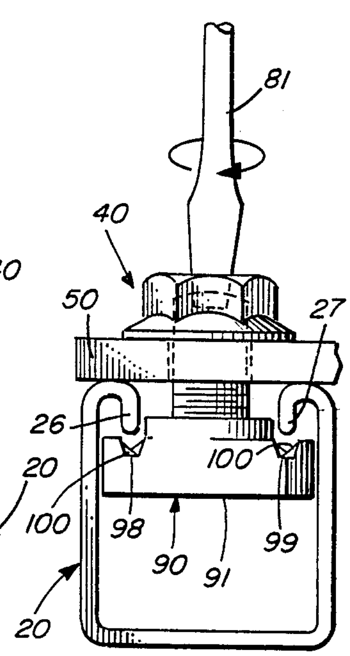
FIG. 6 is a view similar to FIG. 5 illustrating the position of the unitary connection assembly when rotated 90°.

The unitary connection assembly 40, shown in FIG. 1 and in part, in FIGS. 2, 4–10 comprises fixture 50, having aperture 60 shown, in part, n FIGS. 2, 4–10, biasing member 70, such as a coil spring, wave spring, or other spring like device, threaded member 80, such as a torquing nut, hex nut, flange nut or other such nuts, and fastener 90. Fastener 90 can be formed in one piece by a sintered metal process or by forging or a threaded rod having a slot at one end can be welded or peened into a threaded nut to form fastener 90. The channel member 20 has a bottom section 21, two parallel side sections 22, 23 and top section 24 having a slot 25 bordered by inwardly projecting flanges 26, 27 and end portions 28, 29 of projecting flanges 26, 27 respectively. The fastener 90 has a body member 91 shown in FIG. 2. The body member 91 has opposite parallel longitudinal side surfaces 92, 93, end surfaces 94, 95, top major face 96 and opposite bottom major face 97. The body member 91 has flange engaging members, such as parallel grooves 98, 99 containing protrusions 100 on the top major face 96. The top major face 96 has a centrally located extended portion 101. The extended portion 101 has a depth, a width, a first diagonal, and a second diagonal. The width, length, and first diagonal dimension 112 of extended portion 101, shown in FIG. 11, are less than the slot width 25 of channel member 20 but the second diagonal dimension 113, shown in FIG. 11, is greater than slot width 25 of channel member 20 providing an alignment stop which will align the parallel grooves 98, 99 of fastener 90 with projecting flanges 26, 27 of channel member 20 shown in FIG. 11 or with projecting flanges 401, 402 of channel member 400 shown in FIG. 10. Body member 91, shown in FIG. 2, has a threaded stud portion 102 extending above extended portion 101. The threaded stud member 102 has a positioning portion 103, such as a slot to receive a tool, located at end portion 105 of threaded stud member 102. Shown in FIG. 5, tool 81, such as a screw driver, is inserted into positioning portion 103 to exert a compressive force and to rotate fastener 90 as illustrated in FIG. 6.

Figure 3:
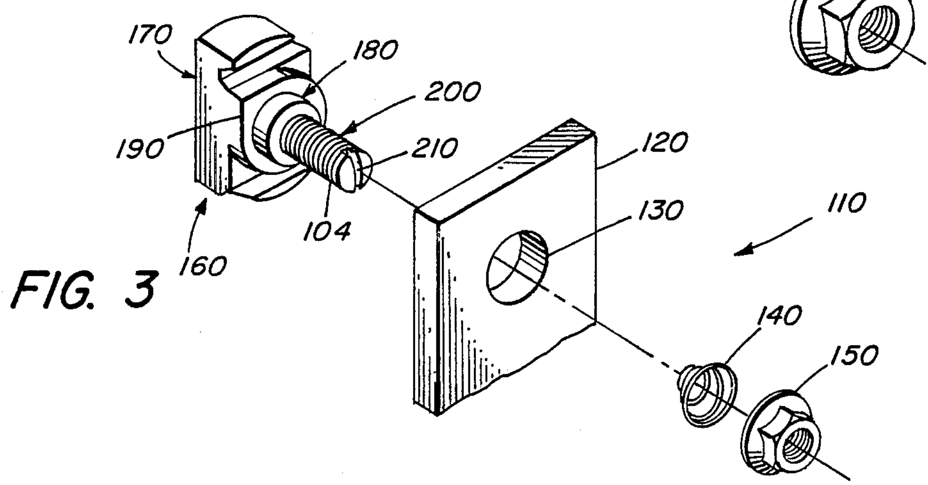
FIG. 3 is a perspective view, in part, of another embodiment of a unitary connection assembly of the present invention.

Shown in FIG. 3 is another embodiment of the present invention, unitary connection assembly 110. Unitary connection assembly 110 comprises fixture 120 having aperture 130, biasing member 140, threaded member 150, such as a nut, and fastener 160. Fastener 160 has a body member 170 similar to the body member 91 of fastener 90 but has a second extended portion 180, such as a shoulder, extending beyond extended portion 190. Threaded stud member 200 has a diameter smaller than threaded stud member 102 of fastener 90 to accommodate biasing member 140 and threaded member 150 both being smaller than biasing member 70 and threaded member 80 shown in FIG. 2. Threaded stud member 200 extends beyond the second extended portion 180.

Threaded stud member 200 has a positioning member 210, such as a slot, located at end portion 104. The second extended portion 180 is adapted to coact with fitting 120 having an aperture 130.

FIGS. 4–8 illustrate one embodiment of a method for attaching unitary connection assembly 40 to channel member 20. Fastener 90 of unitary connection assembly 40 is rotated to enable body member 91 to pass between flanges 26, 27 of channel member 20 when unitary connection assembly 40 is placed on top section 24 of channel member 20.

Figure 7:
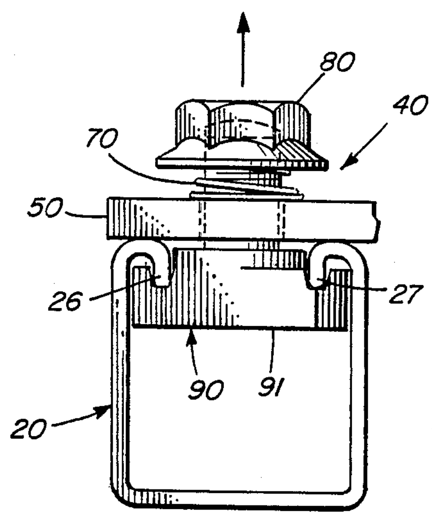
FIG. 7 is a view similar to FIG. 6 illustrating the position of the unitary connection assembly with the compression of the spring relieved from the applied compression as, illustrated in FIG. 5.
Figure 8:
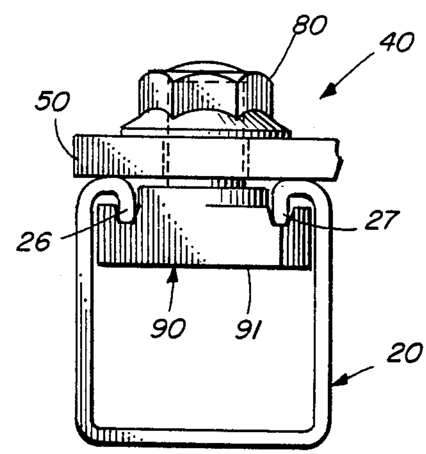
FIG. 8 is a view similar to FIG. 7 illustrating the final position of the connection assembly.
Figures 9, 10, 11, 12:
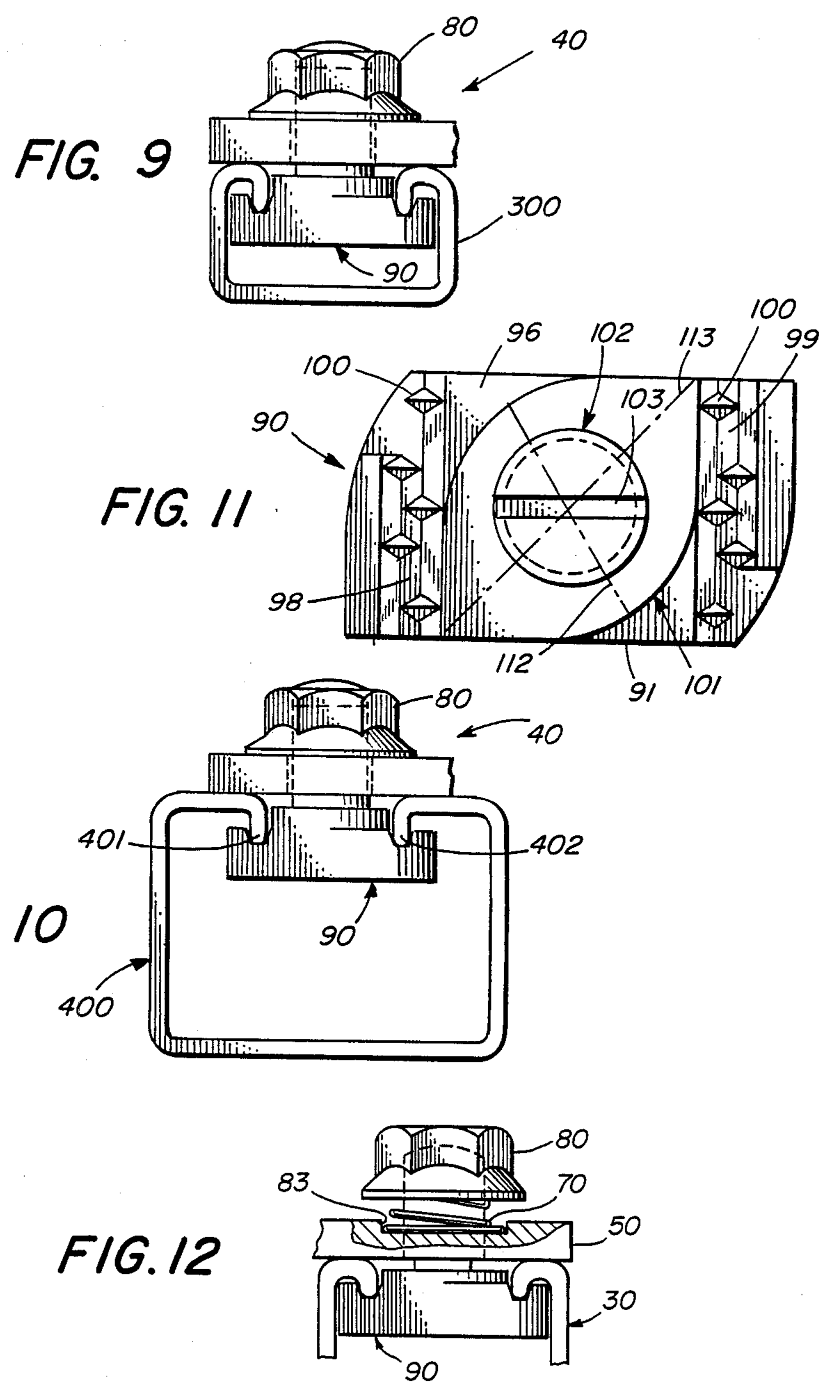
FIG. 9 is an end view, in part, of a connection assembly of the present invention attached to a channel member having a limited depth.
FIG. 10 is an end view, in part, of a connection assembly of the present invention attached to a channel member having a width greater than a standard channel member as illustrated in FIG. 1.
FIG. 11 is a top view of fastener 90 of the present invention illustrated in FIG. 2.
FIG. 12 is a partial cross-sectional view of another preferred embodiment of the present invention.

After unitary connection assembly 40 is positioned as shown in FIG. 4, a compressive force is applied to end portion 103 of threaded stud 102 of fastener 90 by tool 81 placed in positioning position 103 to position body member 91 into channel member 20 to provide a clearance between top major surface 96 of body member 91 and end portions 28, 29 of flanges 26, 27 of channel member 20 when body member 91 is rotated by tool 81 as shown in FIG. 5. The next step is to rotate body member 91 clockwise with tool 81 while maintaining the compressive force to align parallel grooves 98, 99 of body member 91 with end portions 28, 29 of flanges 26, 27 of channel member 20 a shown in FIG. 6. The next step is to remove the compressive force which will cause flange engaging members 96, 97, 98 and 99, shown in FIG. 2 and FIG. 6, of body member 91 to engage end portions 28, 29 of flanges 26, 27 of channel member 20 by the tensile force exerted by biasing member 70 as shown in FIG. 7. The final step is to secure the unitary connection assembly 40 to channel member 20 by rotating threaded member 80 clockwise to apply a torque sufficient to compress biasing member 70 sufficiently to abut or otherwise frictionally engage threaded member 80 with fixture 50 and to secure unitary connection assembly 40 to channel member 20 as shown in FIG. 8. The biasing member or coil spring 70 is, of course, compressed during final tightening, upon movement of the fastening nut 80 from the position shown in FIG. 7 to that shown in FIG. 8. To allow abutment of the nut 80 against the fixture 50, a recess 82 (shown in phantom in FIG. 1) is provided in the threaded member 80 to receive the compressed coil spring 70 therein. Alternatively, such abutment can be allowed by instead providing a recess 83 in the fixture 50, as shown in FIG. 12. In either case, when the coil spring 70 is in the form of a conical spiral as shown in FIGS. 1–4, 7 and 12, the spring 70 is readily compressed by the nut 50 into a single plane, so that the recess 82 and 83 can be relatively shallow.

FIG. 9 illustrates unitary connection assembly 40 affixed to channel member 300 which has a depth less than channel member 20. FIG. 10 illustrates unitary connection assembly 40 affixed to channel member 400 with a width greater than channel member 20.

The fasteners 90 and 160 can be made by cold heading, hot forging, casting methods or powder metal briquetting and sintering process. The preferred method is by the powder metal briquetting and sintering process because the same set of dies can be used to make steel, aluminum, stainless steel and brass or copper fasteners.

Advantages of this invention are as follows:

1. The connection assembly is unitary rather than a collection of individual parts, i.e., fittings, nuts and bolts which require on the job assembly.

2. There are no loose nuts or parts which could become disengaged and slide or fall away.

3. The unitary connection assembly can be used with channel members which have different depths and widths.

4. The slotted end of the threaded stud gives visual proof that the fastener parallel toothed grooves of the connection assembly are properly aligned with the channel flanges.

5. Once the stud has been depressed and turned clockwise the spring under the torquing nut will hold the connection assembly firmly in place until the final tightening of the threaded member.

6. The torquing nuts may be hex nuts or flange nuts and are recessed to receive the spring such that it is completely concealed in the final connection assembly.

While there has been shown and described what is at present considered the preferred embodiment of the invention, it will be obvious to those skilled in the art that various changes and modifications may be made therein without departing from the scope of the invention as defined by the appended claims.

What is claimed is:

1. A unitary connection assembly for connecting channel members, said channel members including two longitudinally extending parallel sides, a bottom joining said sides and a top having inwardly projecting flanges with end portions directed towards the bottom and defining therebetween a longitudinal slot, said unitary connection assembly comprising, in combination:

a fastener having a rectangular body member and a stud member, said body member having longitudinally extending side surfaces, end surfaces, a top and a bottom surface, said stud extending centrally from said top surface, the width of said end surfaces being less than the width of said channel slot so that said body member can be inserted into said channel member through said slot, the length of said longitudinally extending side surfaces being longer than said end surfaces and shorter than the distance between said longitudinally extending channel sides, and one set of diagonally opposed corners of said body being foreshortened to permit rotation of said body in one direction to a position with said end surfaces aligned parallel with said channel sides, said body having a pair of flange engaging grooves parallel to said end surfaces equally spaced on each side of said stud to receive the end portions of said channel flanges;

a fixture including a flat plate portion with an aperture therethrough, said stud extending through said aperture;

a coil biasing spring extending over said stud with one end thereof abutting against said fixture; and a threaded fastening nut threaded onto said stud and abutting the other end of said spring;

said fastener, said apertured fixture, said biasing spring and said threaded nut together as a unit defining a unitary connection assembly;

wherein said body member is positionable with its longitudinally extending sides aligned with said channel slot and inserted therein; wherein said stud is depressable so as to compress said spring and allow said body member to clear the end portions of said channel flanges, said body member then being rotatable to align said channel flanges with said flange engaging grooves; and wherein upon release of said stud, the end portions of said channel flanges are engageable with said grooves so as to permit tightening of said nut to a connection torque sufficient to retain said fastening nut firmly against said fixture and hold said fixture firmly against the top of said channel;

said stud having a portion, along which said nut ravels during said tightening, of a length sufficient to permit abutment of said nut against said fixture during said tightening, thereby allowing said retention of said nut against said fixture.

2. A unitary connection assembly in accordance with claim 1 wherein one of said fixture plate portion and nut have a recess coaxial with said aperture and stud to receive one end of said spring abutting thereagainst.

3. A unitary connection assembly in accordance with claim 2 wherein said threaded nut includes a plurality of threads, and wherein said recess is located in a face of said fastening nut coaxial with the threads thereof permitting the coil spring to be collapsed therein so as to permit abuttment of said nut and said fixture upon tightening of said nut.

4. A unitary connection assembly in accordance with claim 1 furtherer including positioning means located at the free end of said stud to indicate alignment of said flange engaging body grooves with said channel flange ends.

5. A unitary connection assembly in accordance with claim 4 wherein said positioning means includes a slot at the free end of said stud in which a tool can be inserted to provide the downward force and rotational torque to align said body grooves with said channel flanges, said stud slot being disposed parallel with said channel slot when said body grooves are aligned with said channel flanges.

6. A unitary connection assembly for connecting channel members, said channel members including two longitudinally extending parallel sides, a bottom joining said sides and a top having inwardly projecting flanges with end portions directed towards the bottom and defining therebetween a longitudinal slot, said unitary connection assembly comprising, in combination:

a fastener having a rectangular body member and a stud member, said body member having longitudinally extending side surfaces, end surfaces, a top and a bottom surface, said stud extending centrally from said top surface, the width of said end surfaces being less than the width of said channel slot so that said body member can be inserted into said channel member through said slot, the length of said longitudinally extending side surfaces being longer than said end surfaces and shorter than the distance between said longitudinally extending channel sides and one set of diagonally opposed corners of said body being foreshortened to permit rotation of said body in one direction to a position with said end surfaces aligned parallel with said channel sides, said body having a pair of flange engaging grooves parallel to said end surfaces equally spaced on each side of said stud to receive the end portions of said channel flanges, said body member further having a fastener anchoring means, said fastener anchoring means including an extended rectangular portion above said top surface having longitudinally extending side surfaces contiguous with a portion of said body side surfaces and end surfaces inside of said alignment grooves and parallel to said body end surfaces with a first diagonal being less than said slot width, and a second diagonal greater than said slot width, said stud extending above said fastener anchoring means;

a fixture including a flat plate portion with an aperture therethrough, said stud extending through said aperture;

a coil biasing spring extending over said stud with one end thereof abutting against said fixture; and a threaded fastening nut threaded onto said stud and abutting the other end of said spring;

said fastener, said apertured fixture, said biasing spring and said threaded nut together ass a unit defining a unitary connection assembly;

wherein said body member is positionable with its longitudinally extending sides aligned with said channel slot and inserted therein; wherein said stud is depressasble so as to compress said spring and allow said body member to clear the end portions of said channel flanges, said body then being rotatable to align said channel flanges with said flange engaging grooves; and wherein upon release of said stud, the fastener anchoring side surfaces align with said channel slot and the length of said second diagonal of said anchoring means provides an alignment stop, and the end portions of said channel flanges are engageable with said grooves so as to permit tightening of said nut to a connection torque sufficient to hold said fixture firmly against the top of said channel;

said stud having a portion, along which said nut travels during said tightening, of a length sufficient to permit abutment of said nut against said fixture during said tightening, thereby allowing said retention of said nut against said fixture.

7. A unitary connection assembly in accordance with claim 6 wherein said threaded fastening nut is provided with a recess extending therein from one face thereof, coaxial with said threads, so that as said nut is threaded unto said stud said other end of said spring is received in said recess.

8. A structural assembly comprising, in combination:

a channel member; and a unitary connection assembly;

said channel member having two longitudinally extending parallel sides, a bottom joining said sides and a top having inwardly projecting flanges with end portions directed toward the bottom and defining therebetween a longitudinal slot;

said unitary connection assembly including:

a fastener having rectangular body member and a stud member, said body member having longitudinally extending side surfaces, end surfaces, a top and a bottom surface, said stud extending centrally from said top surface, the width of said end surface being less than the width of said channel slot so that said body member can be inserted into said channel member through said slot, the length of said longitudinally extending side surfaces being longer than the end surfaces and shorter than the distance between said longitudinally extending channel sides, and one set of diagonally opposed corners of said body being foreshortened to permit rotation of aid body in one direction to a position with aid end surfaces aligned parallel with said channel sides, said body having a pair of flange engaging grooves parallel to said end surfaces equally spaced on each side of said stud to receive the end portions of said channel flanges;

a fixture including a flat plate portion with an aperture therethrough, said stud extending through said aperture;

a coil biasing spring extending over said stud with one end thereof abutting against said fixture; and a threaded fastening nut having a recess extending therein from one face thereof coaxial with the threads of said threaded nut, said nut being threaded onto said stud and receiving the other end of said spring in said recess;

said fastener, said apertured fixture, said biasing spring and said threaded nut together as a unit defining a unitary connection assembly;

wherein said body member is positionable with its longitudinally extending sides aligned with said channel slot and inserted therein; wherein said stud is depressable so as to compress said spring and allow said body member to clear the end portions of said channel flanges, said body member then being rotatable to align said channel flanges with said flange engaging grooves; and wherein upon release of said stud, the end portions of said channel flanges are engageable with said grooves so as to permit tightening of said nut to a connection torque sufficient to retain said fastening nut firmly against said fixture and retain said fixture firmly against the top of said channel to complete said structural assembly;

said stud having a portion, along which said nut travels during said tightening, of a length sufficient to permit abutment of said nut directly against said fixture during said tightening, thereby allowing said retention of said nut against said fixture.

9. The structural assembly in accordance with claim 8 wherein said unitary connection assembly has a fixture including a second plate portion with an aperture therethrough, and including a second fastener nut, a second coil biasing spring, and a second threaded fastening nut, and further including a second channel member;

whereby said second channel member is assembled to said second flat plate portion of said fixture by said second fastener, coil biasing spring and threaded fastening nut.

10. A structural assembly comprising a unitary connection assembly and at least one channel member, said channel member including two longitudinally extending parallel sides, a bottom joining said sides and a top having inwardly projecting flanges with end portions directed towards said bottom and defining therebetween a longitudinal slot; and said unitary connection assembly comprising, in combination:

a fastener having a rectangular body member and a stud member, said body having longitudinally extending side surfaces, end surface, a top and a bottom surface, said stud extending centrally from said top surface, the width of said end surfaces being less than the width of said channel slot so that said body member can be inserted into said channel member through said slot, the length of said longitudinally extending side surfaces being longer than said end surfaces and shorter than the distance between said longitudinally extending channel sides and one set of diagonally opposed corners of said body being foreshortened to permit rotation of said body in one direction to a position with said end surfaces aligned parallel with said channel sides, said body having a pair of flange engaging grooves parallel to said end surfaces equally spaced on each side of said stud to receive the end portions of said channel flanges, said body member further having a fastener anchoring means, said fastener anchoring means including an extending rectangular portion above said top surface having longitudinally extending side surfaces contiguous with a portion of said body side surfaces and end surfaces inside of said alignment grooves and parallel to said body end surfaces with a first diagonal being less than said slot width, and a second diagonal greater than said slot width, said stud extending above said fastener anchoring means;

a fixture including a flat plate portion with an aperture therethrough, said stud extending through said aperture;

a coil biasing spring extending over said stud with one end thereof abutting against said fixture; and a threaded fastening nut threaded onto said stud and abutting the other end of said spring;

said fastener, said apertured fixture, said biasing spring and said threaded nut together as a unit defining a unitary connection assembly;

wherein said body member is positionable with its longitudinally extending side aligned with said channel slot and inserted therein; wherein said stud is depressable so as to compress said spring and allow said body member to clear the end portions of said channel flanges, said body member then being rotatable to align said channel flanges with said flange engaging grooves; and wherein upon release of said stud, the fastener anchoring side surfaces align with said channel slot and the length of said second diagonal of said anchoring means provides an alignment stop, and the end portions of said channel flanges are engageable with said grooves so as to permit tightening of said nut to a connection torque sufficient to hold said fixture firmly against the top of said channel; said stud having a portion, along which said nut travels during said tightening, of a length sufficient to permit abutment of said nut directly against said fixture during said tightening, thereby allowing said retention of said nut against said fixture; and further wherein said threaded fastening nut is provided with a recess extending therein from one face thereof, coaxial with said threads, so that as said nut is threaded unto said stud said other end of said spring is received in said recess, and abutted thereagainst; wherein said fixture includes a second plate portion with an aperture therethrough, and said connection assembly further comprises a second fastener, a second coil biasing spring, and a second threaded fastening nut, and said structural assembly further comprises a second channel member, whereby said second channel member is assembled to said second flat plate portion of said fixture by said second fastener, coil biasing spring and threaded fastening nut; and wherein said threaded nut includes a plurality of threads, and said recess is located in a face of said fastening nut coaxial with the threads thereof permitting the coil spring to be collapsed therein so as to permit said direct abuttment of said nut and said fixture upon tightening of said nut;

said connection assembly further comprising positioning means located at the free end of said stud to indicate alignment of said flange engaging body grooves with said channel flange ends, wherein said positioning means includes a slot at the free end of said stud in which a tool can be inserted to provide the downward force and rotational torque to align said body grooves with said channel flanges, said stud slot being disposed parallel with said channel slot when said body grooves are aligned with said channel flanges.

* * * * *